Feb. 20, 1968   A. DEMINGER   3,369,563
PLATE VALVE HAVING A DAMPER PLATE
Filed Oct. 19, 1965
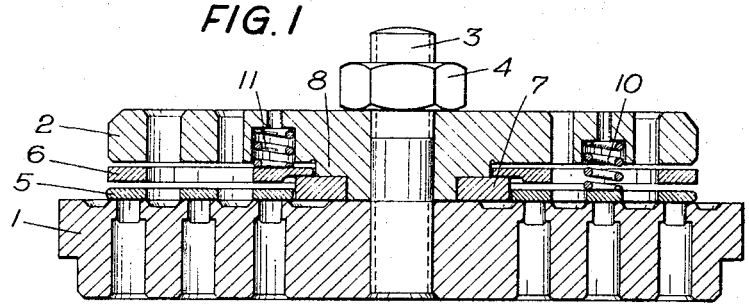
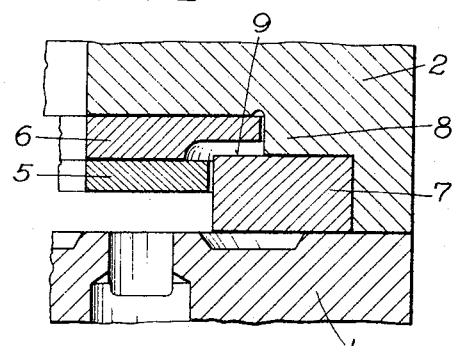
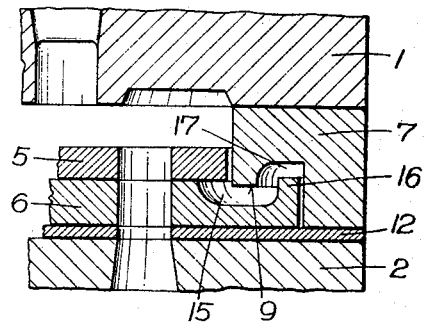
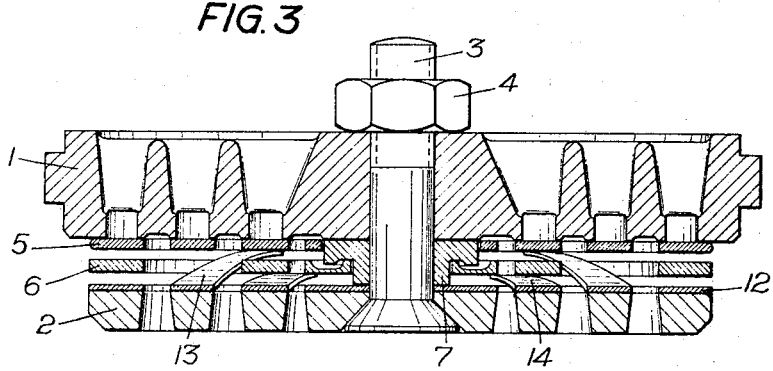
Inventor
Alois Deminger
By
Watson, Cole, Grindle & Watson
Attys.

United States Patent Office 3,369,563
Patented Feb. 20, 1968

3,369,563
PLATE VALVE HAVING A DAMPER PLATE
Alois Deminger, Vienna, Austria, assignor to Hoerbiger Ventilwerke Aktiengesellschaft, Vienna, Austria
Filed Oct. 19, 1965, Ser. No. 498,002
Claims priority, application Austria, Nov. 3, 1964, A 9,293/64
3 Claims. (Cl. 137—514)

The invention relates to a plate valve comprising a valve seat, a valve guard and a valve plate slidably located between the valve seat and the valve guard, at least one damper plate being slidably arranged between the valve plate and the valve guard in spaced relation to the latter and slidingly guided jointly with the valve plate on a stepped-down guide surface, such as a guide ring, the shoulder thus formed limiting the stroke of the damper plate.

In conventional plate valves of this type, the valve plate first abuts during its opening motion against the damper plate, its speed being reduced by the inertia of the damper plate and by the action of springs, if any, acting thereupon, so that the impact of the valve plate upon the valve guard is attenuated. With similar valves comprising a slidingly guided valve plate, the possible maximum stroke of the damper plate is limited, since it must amount to less than the thickness of the valve plate, as otherwise the valve plate movement would exceed its guide surface. But even if the stroke of the damper plate is smaller, the valve plate rubs against the upper edge of the shoulder of the guide surface, so that during the second half of the stroke the valve plate is guided only over part of its thickness. This rubbing causes premature wear of the valve plate rim adjoining the guide surface. In addition, the valve plate is liable to tilt or stick, thereby jeopardizing the smooth operation of the valve.

It is the object of the invention to eliminate these drawbacks by providing a valve comprising a valve plate resting against the guide surface during the whole stroke.

According to the invention, a recess is provided in the damper plate in the area of the contact surface thereof with the shoulder of the guide surface, such as by turning or grinding. Consequently, the guide surface for the valve plate may, for the same stroke and the same thickness of the damper plate in the section of the latter located above the valve plate, wherein the said damper plate protrudes from the shoulder of the guide surface towards the valve plate, be higher by an amount equal to the depth of the recess in the damper plate, so that its edge will no longer rub against the valve plate even when the valve is open. As a result, the valve plate is at all times adequately guided. Furthermore, the stroke of the damper plate can be adapted to meet given requirements by appropriately dimensioning the depth of the recess, even in excess of the thickness of the valve plate, if required.

Another object of the invention consists in ensuring adequate guidance also for the damper plate. For that purpose, the recess may be provided in spaced relation to the rim of the damper plate, the shoulder being provided with an indent into which the thicker rim of the damper plate engages. Thus the damper plate and the shoulder of the guide surface are interlocked pawl-fashion, thereby making provision for amply dimensioned guide surfaces both for the valve plate and the damper plate.

According to a further feature of the invention an arrangement may be provided where the depth of the recess as measured in the direction of the stroke of the damper plate about equals the stroke of the damper plate. This is the smallest possible depth of the recess where the valve plate will not yet rub against the edge of the shoulder of the guide ring.

Further details of the invention will appear from the following description of several embodiments of the invention with reference to the accompanying drawing in which:

FIG. 1 is an axial cross-sectional view of a plate valve according to the invention,
FIG. 2 showing a detail of same on a larger scale,
FIG. 3 is an axial cross-sectional view of another embodiment of the invention and
FIG. 4 shows an enlarged detail of the plate valve as illustrated in FIG. 3.

The plate valves as illustrated in the drawing comprise a valve seat 1, a valve guard 2, a central bolt 3 with a nut 4, a valve plate 5 and a damper plate 6, guide ring 7 being provided for the sliding guidance of the valve plate 5. The damper plate is also slidingly guided. For that purpose, the valve guard 2 is designed with a cylindrical projection 8 stepped down towards the guide ring 7 as shown in FIG. 1, whereas in the embodiment illustrated in FIG. 3 the guide ring 7 itself is of a stepped-down design. The shoulder thus produced also serves as a stroke limit for the damper plate 6 and is designated by reference number 9 for the two embodiments of the invention.

As shown in FIG. 1, the valve plate 5 is loaded by means of helical springs 10, and the damper plate 6 by helical springs 11. In the valve illustrated in FIG. 3, however, provision has been made for a spring plate 12 comprising long spring arms 13 pressing against the valve plate 5 and in addition, short damper arms 14 acting upon the damper plate 6. The hub of the spring plate is firmly clamped between the valve guard 2 and the guide ring 7.

In the area of its contact with the shoulder 9 of the guide ring 7, the damper plate 6 presents a recess 15. In the embodiment shown in FIGS. 1 and 2, the inner rim of the damper plate 6 has been recessed by turning or grinding to about half its original thickness, the depth of the recess 15 as measured in the direction of the stroke motion of the damper plate 6 being about equal to the stroke of the damper plate. Because of this recess 15 in the damper plate 6, the guide surface for the valve plate 5 defined by the guide ring 7 can be moved closer to the valve guard 2 in the direction of the stroke motion, so that the valve plate 5 is not allowed to rub against the edge of the shoulder 9. This can be clearly seen from FIG. 2 where the position of the valve plate is shown when the valve is open. This design precludes tilting or jamming of the valve plate 5 at the edge of the shoulder 9 in addition to reducing wear of the surface of the valve plate 5 sliding on the guide ring 7. The reduced thickness of the damper plate 6 in the area of the projection 8 serving as a guide means shown in the embodiment of the invention illustrated in FIGS. 1 and 2, is of lesser importance, because the damper plate 6 executes a considerably shorter stroke than the valve plate 5.

FIGS. 3 and 4 illustrate an embodiment of the invention where the full height of the damper plate 6 is retained for guiding purposes. The recess 15 in the damper plate 6 is provided in spaced relation to the rim 16 of the damper plate, and in addition the shoulder 9 of the guide ring 7 presents an indent 17 into which the thicker rim 16 of the damper plate engages pawl-fashion. FIG. 4 again shows the lifted position of the valve plate 5 and of the damper plate 6 when the valve is open. It may be seen that even when the valve is open, the valve plate 5 will not rub against the edge of the shoulder 9 and yet the entire thickness of the damper plate 6 is available for the guidance of same. In this case too, the depth of the recess 15 in the damper plate 6 as measured in the direction of the stroke motion and the depth of the indent 17 in the guide ring 7 are about equal to the stroke of the damper plate 6, the recess 15 being preferably of a slightly greater depth than the indent 17 so that the damper plate will impinge upon the guide ring 7 with the reinforced rim 16, and not with the bottom of the recess 15.

I claim:

1. A plate valve comprising a valve seat and a valve guard located in spaced relation to the valve seat and the valve seat and the valve guard having through flow openings therein, a valve plate arranged in the interstice between the valve seat and the valve guard, and a damper plate provided between the valve plate and the valve guard and displaceable towards the valve guard, both plates being slidingly guided on a stepped-down guide surface, the shoulder of same representing an abutment for the damper plate and limiting the stroke motion of the damper plate in the direction of the valve seat, the damper plate presenting a recess in the area of its contact with the shoulder of the guide surface, so that the damper plate will protrude with its rim located above the valve plate from the said shoulder when resting on the shoulder.

2. A plate valve as claimed in claim 1, wherein the recess is provided in spaced relation to the rim of the damper plate and the shoulder of the guide surface presents an indent into which the rim of the damper plate protruding from the recess engages when the damper plate rests on the shoulder.

3. A plate valve as claimed in claim 1, wherein the depth of the recess as measured in the direction of the stroke motion of the damper plate is about equal to the amount of the stroke of the damper plate.

References Cited
UNITED STATES PATENTS 2,870,783   1/1959   Kehler _____ 137—516.13

WILLIAM F. O'DEA, *Primary Examiner.*

D. J. ZOBKIW, *Assistant Examiner.*